US012651453B2

(12) United States Patent
Hoso et al.

(10) Patent No.: US 12,651,453 B2
(45) Date of Patent: Jun. 9, 2026

(54) CONTAINER MEASUREMENT SYSTEM FOR CALCULATING THREE-DIMENSIONAL INFORMATION ABOUT A CONTAINER

(71) Applicant: KOBELCO CONSTRUCTION MACHINERY CO., LTD., Hiroshima (JP)

(72) Inventors: Yukihiro Hoso, Hiroshima (JP); Sho Fujiwara, Hiroshima (JP); Shingun Kyu, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 294 days.

(21) Appl. No.: 18/264,840

(22) PCT Filed: Dec. 2, 2021

(86) PCT No.: PCT/JP2021/044236
§ 371 (c)(1),
(2) Date: Aug. 9, 2023

(87) PCT Pub. No.: WO2022/190484
PCT Pub. Date: Sep. 15, 2022

(65) Prior Publication Data
US 2024/0112459 A1 Apr. 4, 2024

(30) Foreign Application Priority Data
Mar. 8, 2021 (JP) ................................. 2021-036652

(51) Int. Cl.
*G06V 10/98* (2022.01)
*G06T 7/50* (2017.01)
*G06T 7/70* (2017.01)

(52) U.S. Cl.
CPC ................ *G06V 10/98* (2022.01); *G06T 7/50* (2017.01); *G06T 7/70* (2017.01)

(58) Field of Classification Search
None
See application file for complete search history.

(56) References Cited

U.S. PATENT DOCUMENTS 11,348,322 B1 * 5/2022 Treskunov ............ G06T 15/205
2010/0108188 A1 5/2010 Correns et al.
(Continued)

FOREIGN PATENT DOCUMENTS

CN 107251093 A 10/2017
CN 109492639 A 3/2019
(Continued)

OTHER PUBLICATIONS

International Search Report issued Feb. 22, 2022 in PCT/JP2021/044236 filed on Dec. 2, 2021 2 pages.
(Continued)

*Primary Examiner* — Henok Shiferaw
(74) *Attorney, Agent, or Firm* — Oblon, McClelland, Maier & Neustadt, L.L.P.

(57) ABSTRACT

A container measurement system enables accurate calculation of three-dimensional information about a container. The container measurement system includes: a distance image acquisition part provided in a working machine that performs a loading work to a container for acquiring a distance image of the container; a calculation part that calculates, on the basis of the acquired distance image, three-dimensional information including a three-dimensional position and a three-dimensional shape of the container; a storage part that stores three-dimensional shapes of various kinds of containers; a specifying part that specifies a kind of the container subjected to the calculation on the basis of the calculated (Continued)

three-dimensional shape of the container and the three-dimensional shapes of the various kinds of containers stored in the storage part; and a correction part that corrects the calculated three-dimensional information about the container.

6 Claims, 8 Drawing Sheets

(56) References Cited

U.S. PATENT DOCUMENTS

| | | | | |
|---|---|---|---|---|
| 2015/0376868 A1* | 12/2015 | Jackson | .................... | E02F 9/26 |
| | | | | 701/50 |
| 2016/0133230 A1* | 5/2016 | Daniels | ................... | G06F 3/147 |
| | | | | 345/633 |
| 2019/0026914 A1* | 1/2019 | Hageman | .............. | G01B 11/26 |
| 2019/0093321 A1 | 3/2019 | Hiekata | | |
| 2020/0040555 A1 | 2/2020 | Hageman et al. | | |
| 2020/0325655 A1 | 10/2020 | Hageman et al. | | |
| 2021/0292998 A1 | 9/2021 | Kawamoto | | |
| 2021/0372086 A1* | 12/2021 | Aizawa | ................... | E02F 9/262 |
| 2022/0230348 A1* | 7/2022 | Huber | ....................... | G06T 7/74 |

FOREIGN PATENT DOCUMENTS

| | | | |
|---|---|---|---|
| JP | 2000-64359 A | 2/2000 | |
| JP | 2000-192514 A | 7/2000 | |
| JP | 2001-55762 A | 2/2001 | |
| JP | 2016-89388 A | 5/2016 | |
| JP | 2017-157016 A | 9/2017 | |
| JP | 2020-35380 A | 3/2020 | |

OTHER PUBLICATIONS

Extended European Search Report issued on Jul. 22, 2024 in European Patent Application No. 21930330.2, 6 pages.

Combined Chinese Office Action and Search Report issued May 24, 2025 in Chinese Patent Application No. 202180092376.8 (with unedited computer-generated English translation of Office Action only), 15 pages.

* cited by examiner

FIG.3

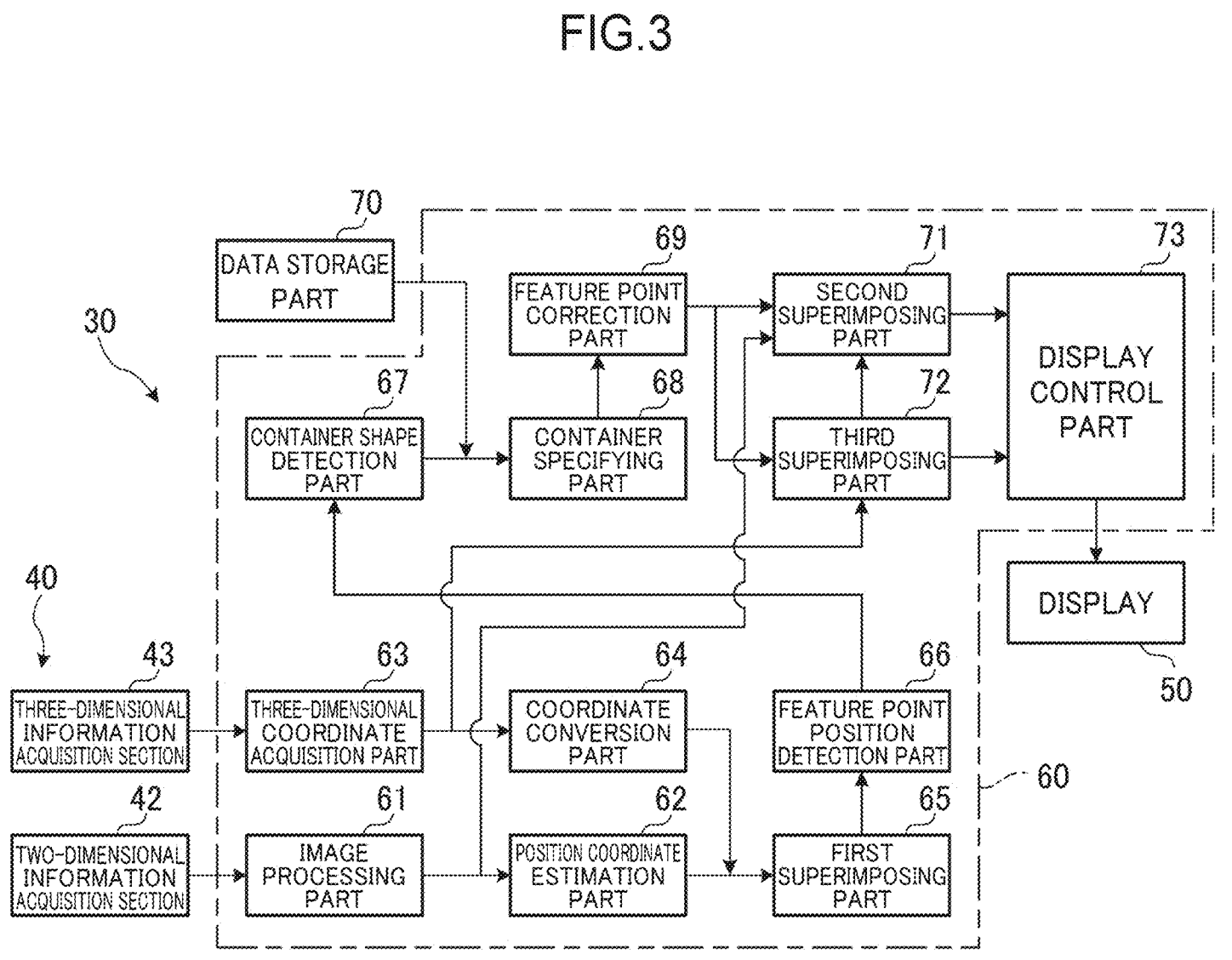

73 DISPLAY CONTROL PART

50 DISPLAY

71 SECOND SUPERIMPOSING PART

72 THIRD SUPERIMPOSING PART

66 FEATURE POINT POSITION DETECTION PART

65 FIRST SUPERIMPOSING PART

69 FEATURE POINT CORRECTION PART

68 CONTAINER SPECIFYING PART

64 COORDINATE CONVERSION PART

62 POSITION COORDINATE ESTIMATION PART

70 DATA STORAGE PART

67 CONTAINER SHAPE DETECTION PART

63 THREE-DIMENSIONAL COORDINATE ACQUISITION PART

61 IMAGE PROCESSING PART

30

60

43 THREE-DIMENSIONAL INFORMATION ACQUISITION SECTION

42 TWO-DIMENSIONAL INFORMATION ACQUISITION SECTION

40

CONTAINER MEASUREMENT SYSTEM FOR CALCULATING THREE-DIMENSIONAL INFORMATION ABOUT A CONTAINER

TECHNICAL FIELD

The present invention relates to a container measurement system for calculating three-dimensional information about a container.

BACKGROUND ART

For instance, Patent Literature 1 describes a technology of calculating three-dimensional information about a container. The technology described in the literature includes photographing four feature points of the container by a camera and calculating a three-dimensional position for each of the feature points.

CITATION LIST

Patent Literature

Patent Literature 1: Japanese Unexamined Patent Publication No. 2000-064359

The technology described in Patent Literature 1 faces a difficulty in stably calculating the three-dimensional information on a feature point when a camera fails to appropriately photograph the feature point. As a result, it is difficult to stably calculate three-dimensional information about the container.

Under the circumstances, a possible way is to calculate three-dimensional information on a feature point by extracting the feature point with use of a publicly known deep learning technique even when the camera fails to appropriately photograph the feature point as described above. However, even use of the deep learning technique may fail to accurately extract the feature point on some occasions.

SUMMARY OF INVENTION

An object of the present invention is to provide a container measurement system that enables accurate calculation of three-dimensional information about a container.

The present invention provides a container measurement system. The container measurement system includes: a distance image acquisition part provided in a working machine that performs a loading work to a container for acquiring a distance image of the container; a calculation part that calculates, on the basis of the acquired distance image, three-dimensional information including a three-dimensional position and a three-dimensional shape of the container; a storage part that stores three-dimensional shapes of various kinds of containers; a specifying part that specifies a kind of the container subjected to the calculation on the basis of the three-dimensional shape of the container calculated by the calculation part and the three-dimensional shapes of the various kinds of containers stored in the storage part; and a correction part that corrects, on the basis of the three-dimensional shape of the kind of the container specified by the specifying part, the three-dimensional information about the container calculated by the calculation part.

BRIEF DESCRIPTION OF DRAWINGS

FIG. 3 is a block diagram of a container measurement system according to the embodiment of the present invention.

DESCRIPTION OF EMBODIMENTS

Hereinafter, a preferable embodiment of the present invention will be described with reference to the accompanying drawings.

Configuration of a Transport Vehicle

Figure 1:
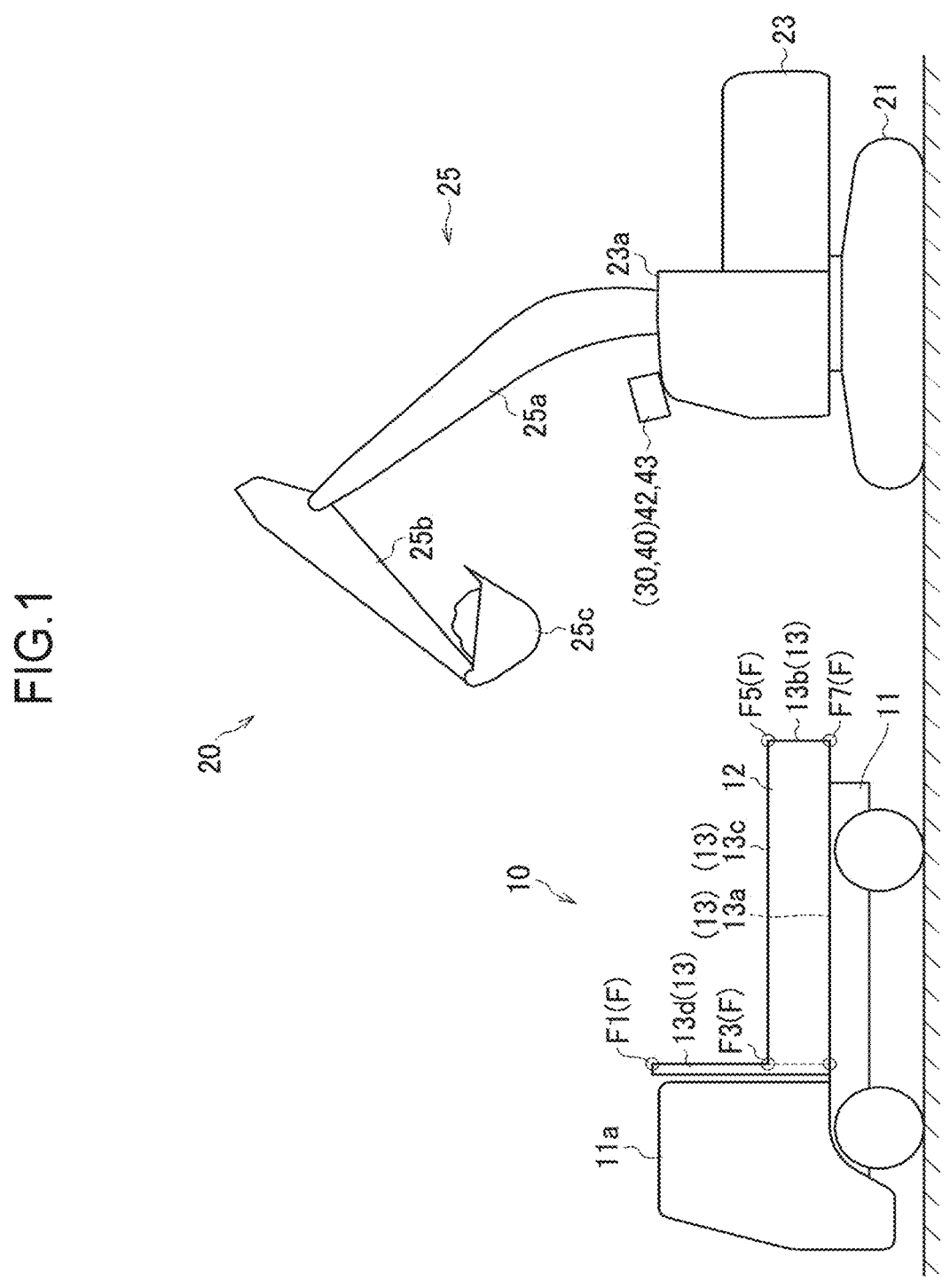
FIG. 1 is a side view of a transport vehicle and a working machine in an embodiment of the present invention.

A container measurement system in an embodiment of the present invention aims at calculating three-dimensional information about a container. FIG. 1 is a side view of a transport vehicle 10 and a working machine 20 in the embodiment. As shown in FIG. 1, the transport vehicle 10 includes a container 12. The transport vehicle 10 is intended for transporting an object (load object) loaded by the working machine 20, and may be a dump truck or another truck.

The transport vehicle 10 includes a main body 11 and the container 12. The main body 11 is travelable on the ground and supports the container 12. The main body 11 has an operating compartment 11a. The container 12 is located in the rear of the operating compartment 11a in the transport vehicle 10.

The container 12 serves as a load bed of the transport vehicle 10. The container 12 has, for example, a shape like a box shape without a cover (see FIG. 2). The container 12 has a flat part 13. The container 12 accommodates the load object. The load object to be accommodated in the container 12 may be, for example, soil and sand, or waste or industrial waste. The container 12 may be movable with respect to the main body 11, or may be fixed to the main body 11. The container 12 may be, for example, a container directly arrangeable on the ground in place of the load bed of the transport vehicle 10.

Hereinafter, directions concerning the transport vehicle 10 are defined as follows, specifically, a direction from the operating compartment 11a to the container 12 is defined as "transport vehicle rearward direction", and a direction from the container 12 to the operating compartment 11a is defined as "transport vehicle forward direction".

Figure 2:
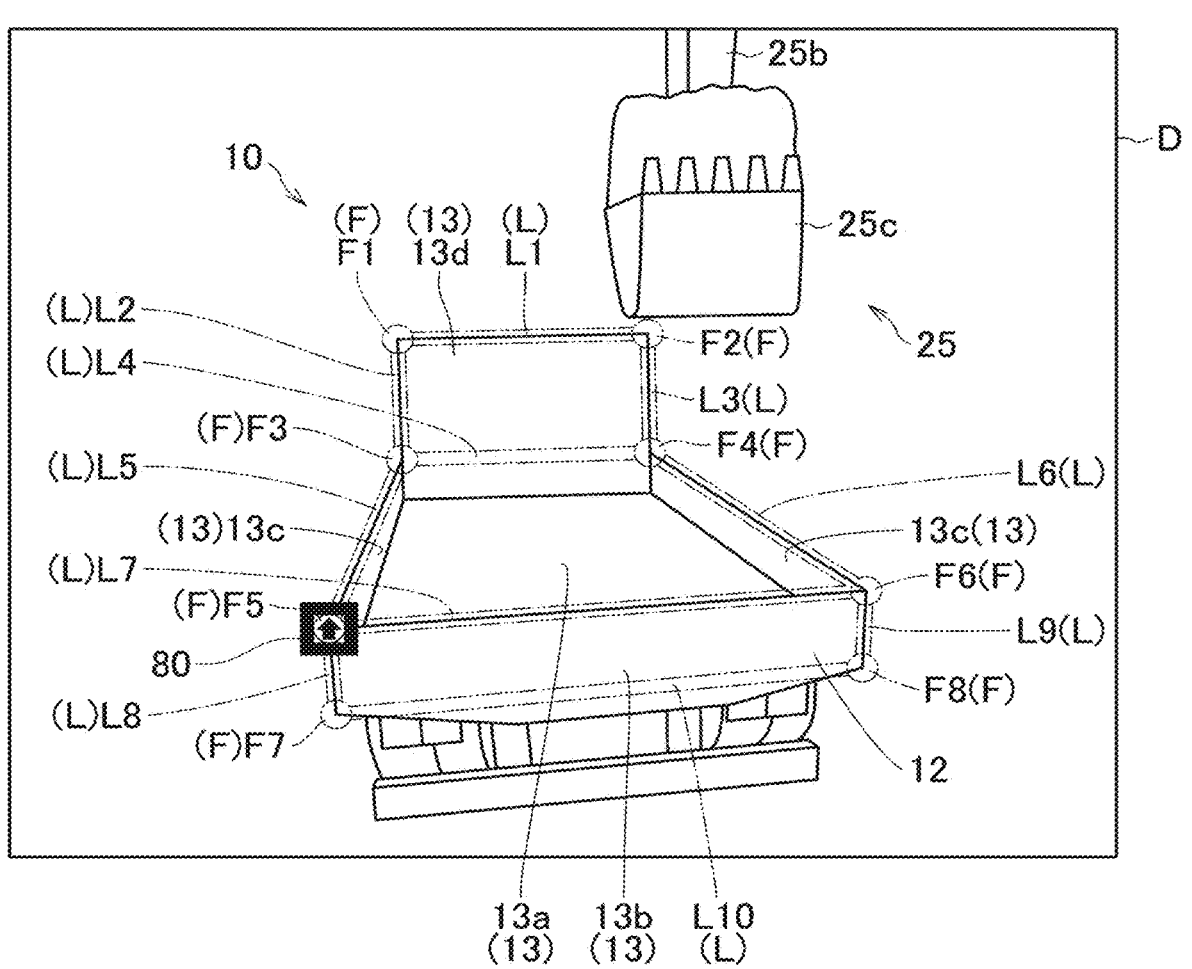
FIG. 2 is a view of the transport vehicle seen from the working machine in the embodiment of the present invention.

FIG. 2 is a view of the transport vehicle 10 seen from the working machine 20 in the embodiment. As shown in FIG. 2, the flat part 13 indicates a flat or substantially flat part of the container 12. The flat part 13 may have a flat shape or substantially flat shape as a whole. The flat part 13 may be uneven, or may have a gently curving surface.

The flat part 13 has a floor 13a, a tail gate wall 13b, side gate walls 13c, and a guard wall 13d. The floor 13a defines a bottom surface (lower surface) of the container 12. The tail gate wall 13b defines a rear surface of the container 12 in a transport vehicle rearward portion of the container 12 and extends upward from the floor 13*a* in the transport vehicle rearward portion. The side gate walls 13*c* respectively define left and right surfaces of the container 12 and extend upward from left and right ends of the floor 13*a*. The guard wall 13*d* defines a front surface of the container 12 in a transport vehicle forward portion and extends from the floor 13*a* in the transport vehicle forward portion. The guard wall 13*d* extends upward further than the side gate walls 13*c* and further than the tail gate wall 13*b*.

Configuration of the Working Machine

As shown in FIG. 1, the working machine 20 performs a work (loading work) of loading a load object to the container 12. The working machine 20 may be configured to, for example, scoop the load object, or sandwich and grasp the load object. Examples of the working machine 20 include a construction machine that performs a construction work, e.g., a hydraulic excavator. The working machine 20 includes a lower traveling body 21, an upper slewing body 23, and an attachment 25. The lower traveling body 21 causes the working machine 20 to travel.

The lower traveling body 21 includes, for example, a crawler. The upper slewing body 23 is slewably mounted on the lower traveling body 21. The upper slewing body 23 has a cab 23*a*.

The attachment 25 transfers the load object. The attachment 25 has a boom 25*a*, an arm 25*b*, and a leading end attachment 25*c*. The boom 25*a* is tiltably attached to the upper slewing body 23 (rotatably upward and downward). The arm 25*b* is rotatably attached to the boom 25*a* (in a pulling or pushing manner). The leading end attachment 25*c* is provided on a distal end of the attachment 25 and rotatably attached to the arm 25*b*. The leading end attachment 25*c* may be a bucket to scoop the load object (e.g., soil and sand), or a device (e.g., grapple) to sandwich and grasp the load object.

Configuration of the Container Measurement System

The container measurement system is a system for measuring three-dimensional information about the container 12. The term "three-dimensional information about the container 12" represents information including a three-dimensional position (three-dimensional coordinate) and a three-dimensional shape. The container measurement system measures a position, a direction, and a shape of the container 12 with respect to the working machine 20. As an example, a predetermined origin point or reference point is set in the working machine 20.

FIG. 3 is a block diagram of the container measurement system 30. As shown in FIG. 3, the container measurement system 30 includes a distance image acquisition part 40, a display (display device) 50, a controller 60, and a data storage part 70.

The distance image acquisition part 40 acquires a distance image D showing the container 12 as shown in FIG. 2. The distance image D includes distance information (depth information). Specifically, the distance image D corresponds to a distribution of distances respectively from measurement points around the working machine 20 to the origin point. The distance image acquisition part 40 is provided in the working machine 20. The distance image acquisition part 40 is arranged at such a position as to acquire the distance image D of the container 12 and a periphery of the container 12 when the working machine 20 performs the loading work. For instance, the distance image acquisition part 40 may be arranged or provided inside the cab 23*a*, may be arranged outside the cab 23*a*, or may be arranged on a top surface of the cab 23*a* as exemplified in FIG. 1. The distance image acquisition part 40 may automatically follow the container 12 to acquire the distance image D of the container 12.

As shown in FIG. 3, the distance image acquisition part 40 has a two-dimensional information acquisition section 42 and a three-dimensional information acquisition section 43. The two-dimensional information acquisition section 42 acquires (captures) two-dimensional information (image) showing the container 12. The two-dimensional information acquisition section 42 is, for example, a camera.

The three-dimensional information acquisition section 43 acquires three-dimensional information (point cloud data) about the container 12. The three-dimensional information acquisition section 43 measures a distance from the three-dimensional information acquisition section 43 to each component (to be described in detail later) of the container 12. Specifically, for instance, the three-dimensional information acquisition section 43 may include LiDAR (Light Detection and Ranging, or laser Imaging Detection and Ranging), may include a stereo camera, or may include TOD (Time Of Flight) sensor.

The display 50 may be provided in the operating compartment 11*a* of the transport vehicle 10, may be provided in the cab 23*a* of the working machine 20, or may be provided outside the transport vehicle 10 and outside the working machine 20.

The controller 60 executes input and output of a signal, determination, computation like calculation, and storage of information. The controller 60 has an image processing part 61, a position coordinate estimation part 62, a three-dimensional coordinate acquisition part 63, a coordinate conversion part 64, a first superimposing part 65, and a feature point position detection part 66.

The image processing part 61 preprocesses the image acquired by the two-dimensional information acquisition section 42. The preprocessing includes removing a noise from the image and emphasizing an edge in the image.

The position coordinate estimation part 62 estimates a shape of the container 12 from the image preprocessed by the image processing part 61. Specifically, as shown in FIG. 2, the position coordinate estimation part 62 extracts (recognizes, estimates) positions of feature points F (F1 to F8) in the image and positions of links L (L1 to L9) in the image. The position coordinate estimation part 62 extracts each feature point F and each link L by executing, for example, a program for extracting a specific shape from an image. For instance, the program adopts a deep learning technique. In this manner, the position coordinate estimation part 62 acquires two-dimensional information including the image showing the container 12, the position of the feature point F in the image, and the position of the link L in the image.

As shown in FIG. 2, each feature point F corresponds to a point on a corner of the flat part 13. Each link L represents a line connecting two feature points F to each other, and corresponds to, for example, a side line of the flat part 13. In the example shown in FIG. 2, the positions of the feature points F include two positions (F1, F2) on upper ends of the guard wall 13*d*, two positions (F3, F4) on upper ends of the side gate walls 13*c*, 13*c* in the transport vehicle forward portion, and four positions (F5 to F8) on corners of the tail gate wall 13*b*. For instance, when a lower end of the guard wall 13*d* is reflected in the image, the position of the lower end of the guard wall 13*d* may be extracted as the feature point F (see FIG. 1).

In the example shown in FIG. 2, the positions of the links L include positions (L1 to L4) of four sides of a quadrangle in a portion of the guard wall 13*d* that is located at a higher position than the side gate walls 13c. The positions of the links L include positions (L5, L6) of upper sides of the side gate walls 13c and four sides (L7 to L10) of the tail gate wall 13b, specifically, four sides of a quadrangle substantially overlapping the tail gate wall 13b.

Referring back to FIG. 3, the three-dimensional coordinate acquisition part 63 acquires a three-dimensional coordinate of each piece of the point cloud data captured by the three-dimensional information acquisition section 43. The coordinate conversion part 64 acquires a two-dimensional coordinate of each piece of the point cloud data through perspective projection transformation of the three-dimensional coordinate of each piece of the point cloud data. The coordinate system of the two-dimensional coordinate agrees with a coordinate system of the image acquired by the two-dimensional information acquisition section 42.

The first superimposing part 65 superimposes the two-dimensional coordinate of each piece of the point cloud data acquired by the coordinate conversion part 64 and the shape of the container 12 estimated by the position coordinate estimation part 62 one on another. In this manner, a point corresponding to each feature point F shown in FIG. 2 is acquirable from the point cloud data.

The two-dimensional coordinate of each piece of the point cloud data and the estimated shape of the container 12 may be superimposed one on another by using a coordinate system of a machine coordinate. The machine coordinate has an origin at a specific position in the working machine 20. In use of the coordinate system of the machine coordinate, the coordinate system of the two-dimensional coordinate of each piece of the point cloud data is set to agree with the coordinate system of the machine coordinate, and the coordinate system of the image acquired by the two-dimensional information acquisition section 42 is set to agree with the coordinate system of the machine coordinate (so that the positions of the systems are relative to each other).

The feature point position detection part (calculation part) 66 detects (calculates) a three-dimensional coordinate of each feature point F and each link L shown in FIG. 2. Specifically, the feature point position detection part 66 detects a three-dimensional coordinate of a point corresponding to a specific feature point F shown in FIG. 2 from point cloud data superimposed onto the shape of the container 12 by the first superimposing part 65 to calculate a three-dimensional coordinate of a corner of the flat part 13 corresponding to the position of the feature point F. As a result, three-dimensional information on a corresponding link L connecting the feature point F is also calculated. The calculation leads to acquisition of the three-dimensional information about the container 12 (specifically, the feature point F and the link L).

Figure 4:
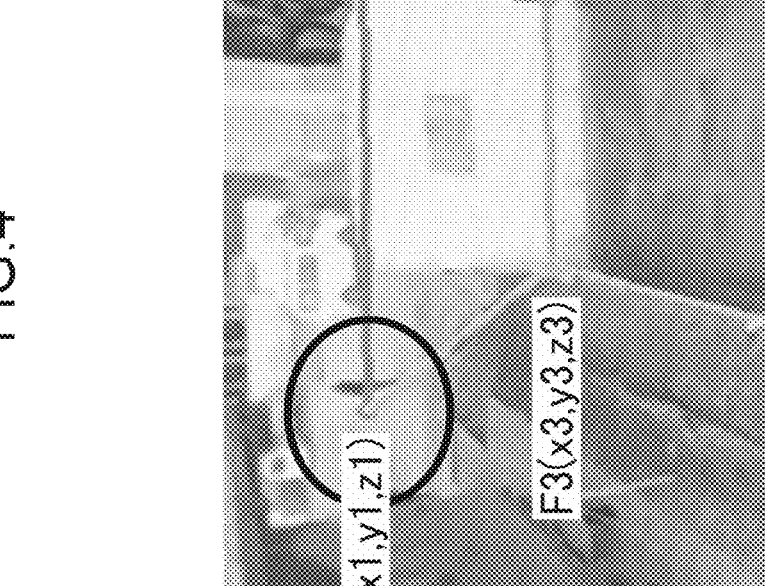
FIG. 4 is an illustration of three-dimensional information about a container in the embodiment of the present invention.

FIG. 4 is an illustration of three-dimensional information about the container 12 detected by the feature point position detection part 66. In the example shown in FIG. 4, the three-dimensional information has an error in the feature point F1 surrounded by a circular sign "○" among eight feature points F (F1 to F8). It is seen from this perspective that even use of the deep learning technique may fail to accurately extract the feature point on some occasions.

As shown in FIG. 3, the controller 60 has a container shape detection part 67, a container specifying part 68, a feature point correction part 69, a second superimposing part 71, a third superimposing part 72, and a display control part 73.

The container shape detection part 67 detects a three-dimensional shape of the container 12 from the three-dimensional coordinate of the feature point F and the three-dimensional information on the link L each calculated by the feature point position detection part 66.

The container shape detection part 67 checks each of the eight feature points F (F1 to F8) concerning the detected three-dimensional shape of the container 12. The container shape detection part 67 then adopts the detected three-dimensional shape of the container 12 when three or more feature points F respectively have correct three-dimensional coordinates. By contrast, the container shape detection part 67 avoids adopting the detected three-dimensional shape of the container 12 when less than three feature points F have correct three-dimensional coordinates. In this case, the feature point position detection part 66 detects (calculates) a three-dimensional coordinate of each feature point F and each link L again.

Figure 5:
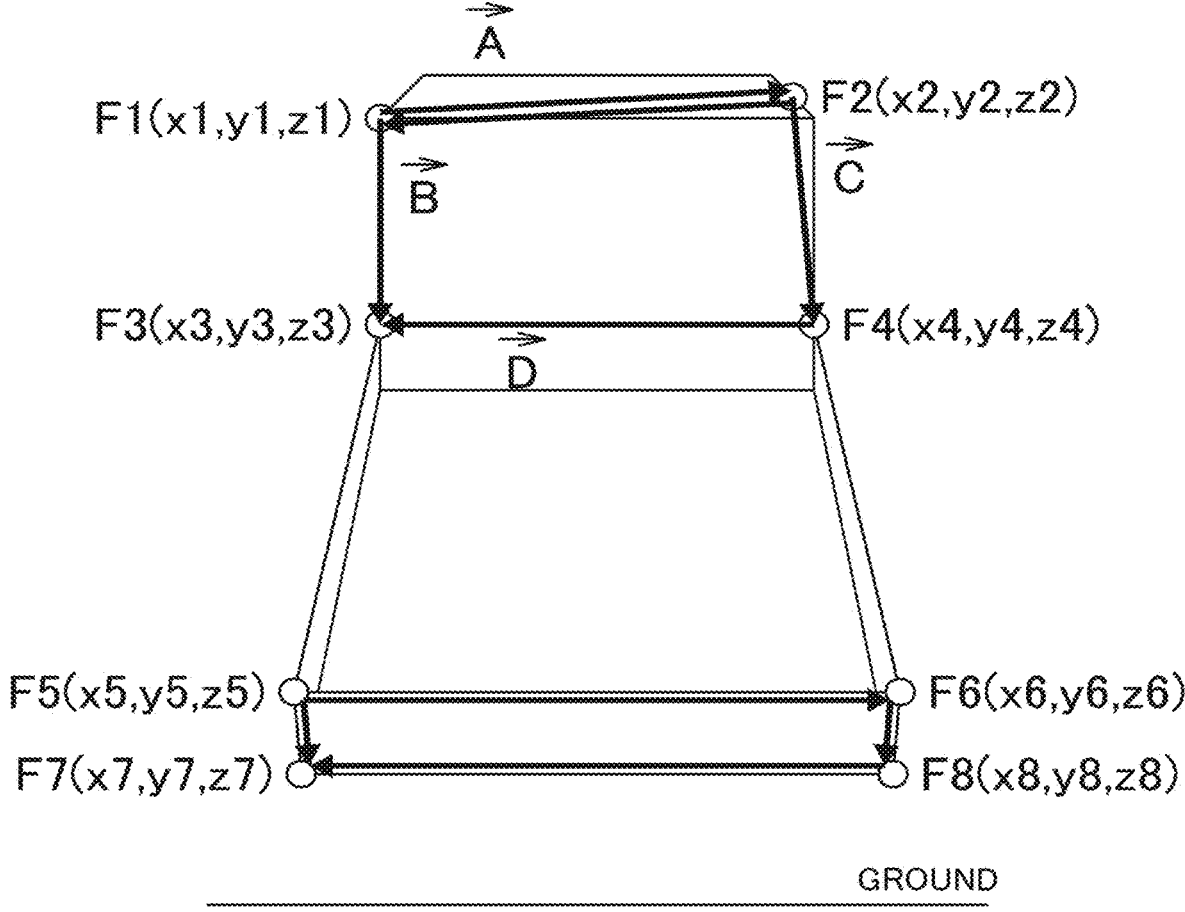
FIG. 5 is an explanatory view of a way of checking a feature point in the embodiment of the present invention.

A way of checking each of the eight feature points F will be described below. FIG. 5 is an explanatory view of the way of checking each feature point. As shown in FIG. 5, the feature point F1 is defined as a reference, and an inner product of a vector A from the feature point F1 to the feature point F2 and a vector B from the feature point F1 to the feature point F3 is obtained. An angle between the vectors is defined as "θ" to determine whether cos θ indicates zero.

The three-dimensional coordinate of the feature point F1 is determined to be correct when the cos θ indicates zero, and the three-dimensional coordinate of the feature point F1 is determined to be incorrect when the cos θ does not indicate zero. Here, the three-dimensional coordinate of each of the eight feature points F has an origin point set at an appropriate position of the working machine 20.

Next, the feature point F2 is defined as a reference, and an inner product of a vector C from the feature point F2 to the feature point F4 and a vector (–A) from the feature point F2 to the feature point F1 is obtained, the vector –A being in the opposite direction to the vector A. Similarly, the aforementioned determination is made. The determination is made for each of the eight features F1 to F8.

Referring back to FIG. 3, the data storage part (storage part) 70 stores three-dimensional shapes of various kinds of containers in advance. The container specifying part (specifying part) 68 specifies a kind of the container 12 subjected to the calculation on the basis of the calculated three-dimensional shape of the container 12 and the three-dimensional shapes of the various kinds of containers stored in the data storage part 70.

The container specifying part 68 specifies the kind of the container by selecting a container having a three-dimensional shape closest to the calculated three-dimensional shape of the container 12 among the three-dimensional shapes of the various kinds of containers stored in the data storage part 70.

In a case where the three-dimensional information about the container calculated from the distance image has an error, no container having a three-dimensional shape matching the three-dimensional shape of the container 12 calculated from the distance image may be found among the three-dimensional shapes of the various kinds of containers stored in the data storage part 70. Even in this case, the kind of the container 12 can be preferably specified by selecting a container having a three-dimensional shape closest to the calculated three-dimensional shape of the container 12.

The feature point correction part (correction part) 69 corrects the calculated three-dimensional information about the container 12 on the basis of the three-dimensional shape of the specified kind of the container among the three-dimensional shapes of the various kinds of containers stored in the data storage part 70. As described above, even when the three-dimensional information about the container 12 calculated from the distance image has an error, correction of the three-dimensional information about the container 12 leads to a success in accurate calculation of the three-dimensional information about the container 12.

The three-dimensional information about the container 12 is adoptable for various controls. For instance, the information is adoptable for automatic operation of the working machine 20 or adoptable for assistive operation of the working machine 20. The information is further adoptable for a control of avoiding a collision between the working machine 20 and the container 12, a control of automatically changing the positions of the working machine 20 and container 12 relative to each other, and a control of notifying an operator of the positions of the working machine 20 and the container 12 relative to each other. In addition, the information is adoptable for calculation of a locus of the leading end attachment 25c from a current position of the leading end attachment 25c to a position (discharge position, e.g., soil discharge position) for discharging the load object.

The second superimposing part (superimposing part) 71 superimposes the corrected three-dimensional information about the container 12 onto the image preprocessed by the image processing part 61 to generate a first superimposed image. As shown in FIG. 2, an AR marker 80 is provided as a marking member on a corner of the flat part 13 that corresponds to the position of the feature point F5. The second superimposing part 71 sets the image at the corrected three-dimensional position of the container 12 with reference to the AR marker 80. The set image and position are superimposed to generate the first superimposed image. The marking member for the setting may be a light (e.g., LED) to be tuned on.

In this manner, the image is set to the corrected three-dimensional position of the container 12 with reference to the AR marker 80. This consequently attains improvement in the accuracy of the setting and achieves a reduction in the burden required for the setting.

Referring back to FIG. 3, the third superimposing part (superimposing part) 72 superimposes the corrected three-dimensional information about the container 12 onto the point cloud data acquired by the three-dimensional coordinate acquisition part 63 to generate a second superimposed image. The third superimposing part 72 superimposes the corrected three-dimensional information about the container 12 onto the point cloud data to generate the second superimposed image after setting the point cloud data at the position of the corrected three-dimensional information. The setting may be executed with reference to the AR marker.

Figure 6:
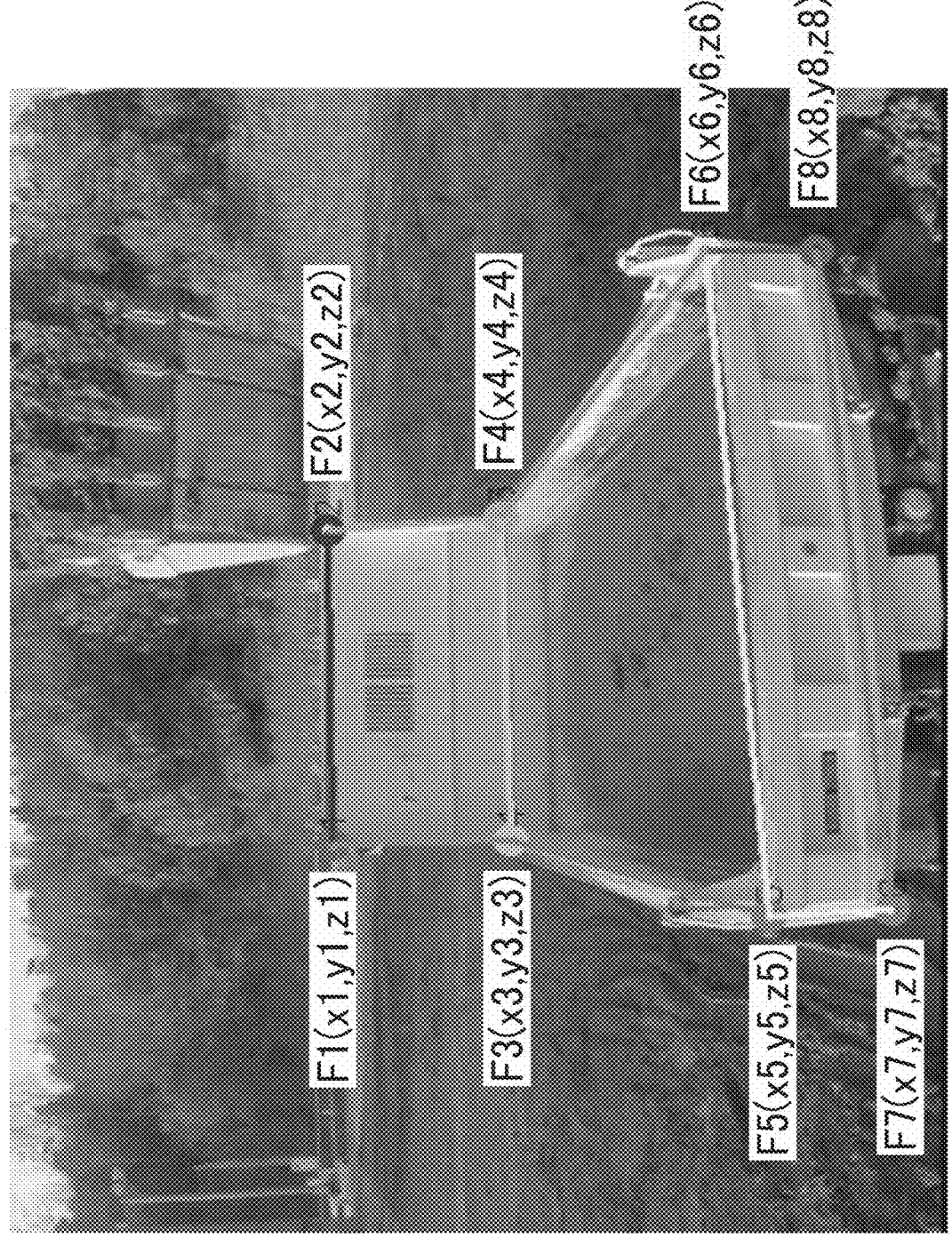
FIG. 6 is an illustration of a first superimposed image by the container measurement system according to the embodiment of the present invention.
Figure 7:
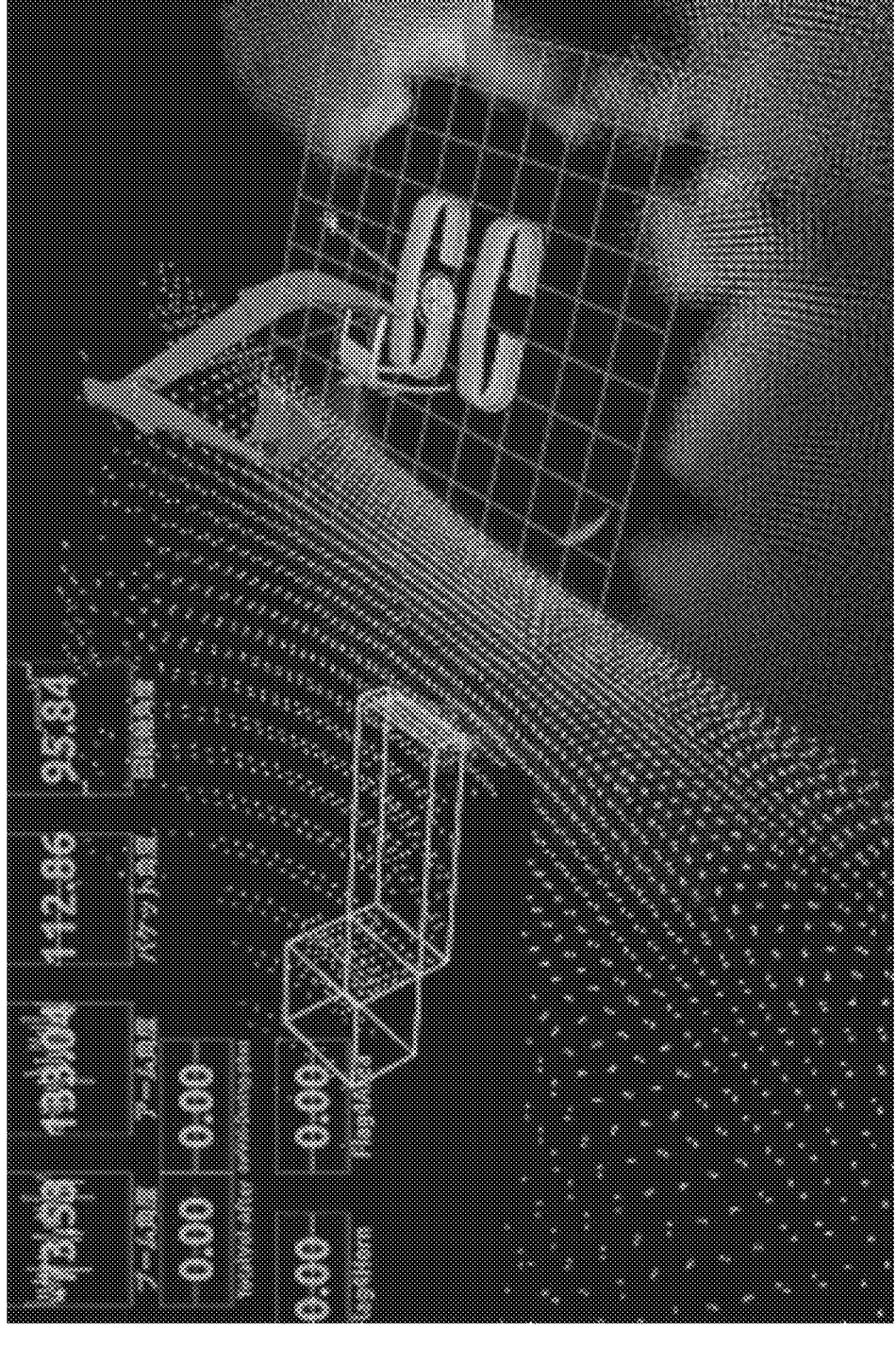
FIG. 7 is an illustration of a second superimposed image by the container measurement system according to the embodiment of the present invention.

The display control part 73 causes the display 50 to display the first superimposed image generated by the second superimposing part 71. FIG. 6 shows an example of the first superimposed image. The display control part 73 further causes the display 50 to display the second superimposed image generated by the third superimposing part 72. FIG. 7 shows an example of the second superimposed image.

Figure 8:
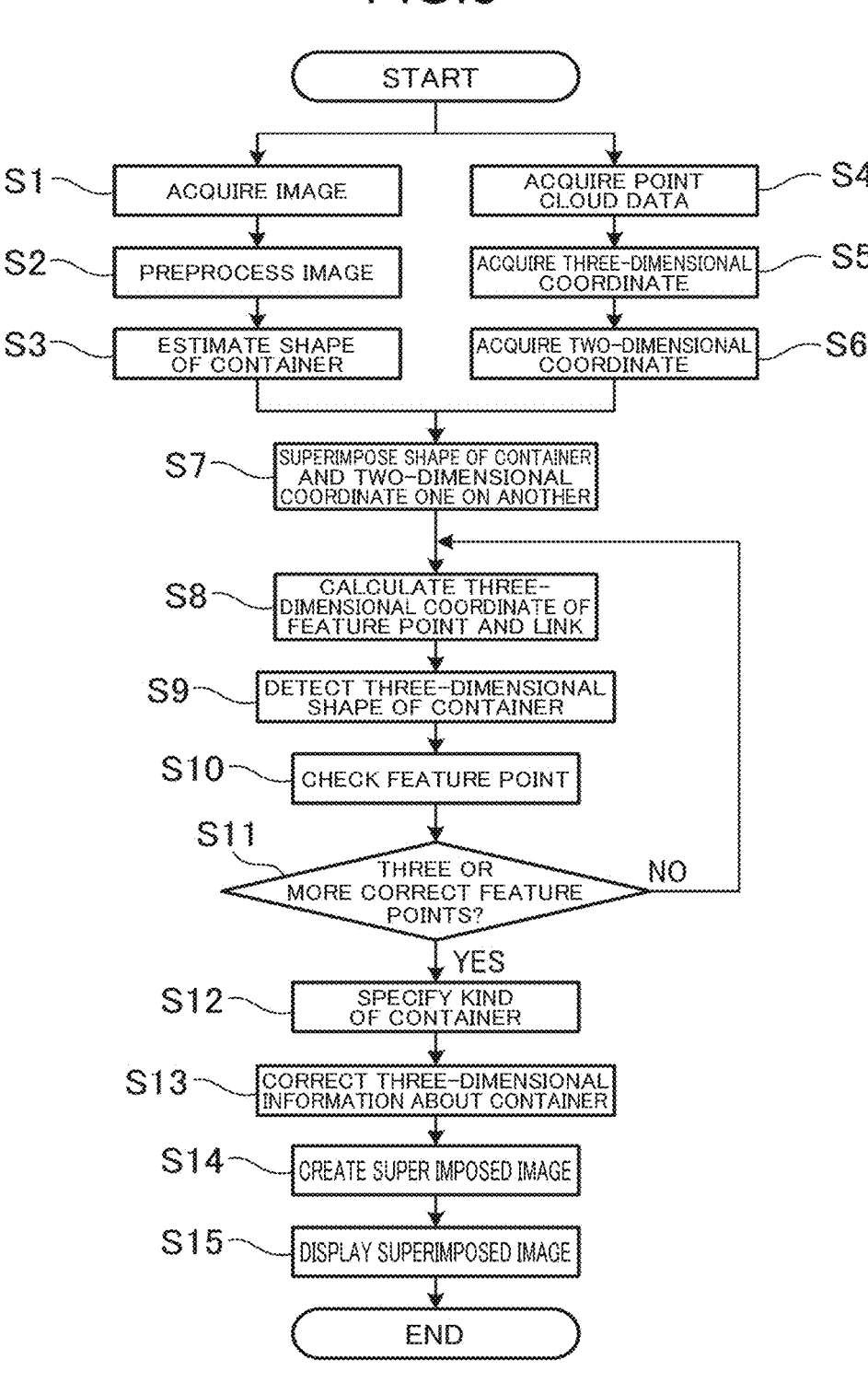
FIG. 8 is a flowchart of a container measurement process in the embodiment of the present invention.

For instance, when the operator remotely manipulates the working machine 20, the operator can recognize a depth to the container 12 by visually confirming the first superimposed image and the second superimposed image.
Operation of the Container Measurement System FIG. 8 is a flowchart of a container measurement process. Next, the operation of the container measurement system 30 will be described with reference to FIG. 8.

First, the controller 60 acquires an image from the two-dimensional information acquisition section 42 (step S1), and preprocesses the acquired image (step S2). The controller 60 then estimates a shape of the container 12 from the preprocessed image by using a deep learning technique (step S3).

Simultaneously with steps S1 to S3, the controller 60 acquires point cloud data from the three-dimensional information acquisition section 43 (step S4), and acquires a three-dimensional coordinate of each piece of the acquired point cloud data (step S5). The controller 60 then acquires a two-dimensional coordinate of each piece of the point cloud data through perspective projection transformation of the three-dimensional coordinate of each piece of the point cloud data (step S6).

Subsequently, the controller 60 superimposes the two-dimensional coordinate of each piece of the point cloud data and the shape of the container 12 one on another (step S7). The controller 60 subsequently calculates a three-dimensional coordinate of each feature point F and each link L (step S8). The controller 60 then detects a three-dimensional shape of the container 12 from the three-dimensional coordinate of the feature point F and the three-dimensional information on the link L (step S9).

Next, the controller 60 checks each of the eight feature points F (F1 to F8) (step S10). The controller 60 subsequently determines whether three or more correct feature points F respectively have correct three-dimensional coordinates (step S11). When determining that less than three correct feature points have correct three-dimensional coordinates in step S11 (NO in step S11), the controller 60 returns to step S8 to calculate a three-dimensional coordinate of each feature point F and each link L again.

By contrast, when determining that three or more correct feature points respectively have the three-dimensional coordinates in step S11 (YES in step S11), the controller 60 specifies a kind of the container 12 on the basis of the calculated three-dimensional shape of the container 12 and three-dimensional shapes of various kinds of containers stored in the data storage part 70 (step S12). The controller 60 then corrects, on the basis of the three-dimensional shape of the specified kind of the container, the calculated three-dimensional information about the container 12 (step S13).

Next, the controller 60 generates a first superimposed image and a second superimposed image (step S14). Specifically, the controller 60 superimposes the corrected three-dimensional information about the container 12 onto the preprocessed image to generate the first superimposed image. The controller 60 further superimposes the corrected three-dimensional information about the container 12 onto the acquired point cloud data to generate the second superimposed image.

Subsequently, the controller 60 causes the display 50 to display the first superimposed image and the second superimposed image (step S15). This process is then finished.

As described heretofore, in the container measurement system 30 according to the embodiment, three-dimensional information including a three-dimensional position and a three-dimensional shape of the container 12 is calculated on the basis of an acquired distance image of the container 12. Further, a kind of the container 12 subjected to the calculation is specified on the basis of the calculated three-dimensional shape of the container 12 and three-dimensional shapes of various kinds of containers stored in the data storage part 70. When the kind of the container 12 is specified, the calculated three-dimensional information about the container 12 is corrected on the basis of the three-dimensional shape of the specified kind of the container. As described above, even when the three-dimensional information about the container 12 calculated from the distance image of the container 12 has an error, correction of the three-dimensional information about the container 12 leads to a success in accurate calculation of the three-dimensional information about the container 12.

The kind of the container 12 subjected to the calculation is specified by selecting a container having a three-dimensional shape closest to the calculated three-dimensional shape of the container 12 among the three-dimensional shapes of the various kinds of containers stored in the data storage part 70. In a case where the three-dimensional information about the container 12 calculated from the distance image of the container 12 has an error, no container having a three-dimensional shape matching the three-dimensional shape of the container 12 calculated from the distance image may be found among the three-dimensional shapes of the various kinds of containers stored in the data storage part 70. Even in this case, selecting a container having a three-dimensional shape closest to the calculated three-dimensional shape of the container 12 succeeds in preferably specifying the kind of the container 12 subjected to the calculation.

The corrected three-dimensional information about the container 12 is superimposed onto the distance image to generate a superimposed image (a first superimposed image, a second superimposed image) after the acquired distance image of the container 12 is set at the corrected three-dimensional position of the container 12. Then, the display 50 displays the superimposed image thereon. For instance, when the operator remotely manipulates the working machine 20, the operator can recognize a depth to the container 12 by visually confirming the superimposed image.

The distance image of the container 12 is set to the corrected three-dimensional position of the container 12 with reference to the marking member (the AR marker 80) provided to the container 12. This consequently attains improvement in the accuracy of the setting and achieves a reduction in the burden required for the setting.

The embodiment of the present invention is described heretofore, but the embodiment is merely described as a detailed example of the present invention without particularly limiting the present invention. It is the matter of design choice for changes in the details of the configuration. Furthermore, the operations and effects described in the embodiments of the present invention are merely listed as optimal operations and effects attained by the present invention, and thus should not be limited thereto.

The present invention provides a container measurement system. The container measurement system includes: a distance image acquisition part provided in a working machine that performs a loading work to a container for acquiring a distance image of the container; a calculation part that calculates, on the basis of the acquired distance image, three-dimensional information including a three-dimensional position and a three-dimensional shape of the container; a storage part that stores three-dimensional shapes of various kinds of containers; a specifying part that specifies a kind of the container subjected to the calculation on the basis of the three-dimensional shape of the container calculated by the calculation part and the three-dimensional shapes of the various kinds of containers stored in the storage part; and a correction part that corrects, on the basis of the three-dimensional shape of the kind of the container specified by the specifying part, the three-dimensional information about the container calculated by the calculation part.

In the configuration, the specifying part may specify the kind of the container subjected to the calculation by selecting a container having a three-dimensional shape closest to the three-dimensional shape of the container calculated by the calculation part among the three-dimensional shapes of the various kinds of containers stored in the storage part.

The configuration may further include: a display device; a superimposing part that superimposes the corrected three-dimensional information about the container onto the distance image to generate a superimposed image after setting the distance image of the container acquired by the distance image acquisition part at a three-dimensional position of the container corrected by the correction part; and a display control part that causes the display device to display the superimposed image.

The configuration may further include a marker provided on the container so as to be captured in the distance image. The superimposing part may set the distance image at the corrected three-dimensional position of the container with reference to the marker.

According to the present invention, three-dimensional information including a three-dimensional position and a three-dimensional shape of a container is calculated on the basis of an acquired distance image of the container. Further, a kind of the container subjected to the calculation is specified on the basis of the calculated three-dimensional shape of the container and three-dimensional shapes of various kinds of containers stored in a storage part. When the kind of the container is specified, the calculated three-dimensional information about the container is corrected on the basis of the three-dimensional shape of the specified kind of the container. Conclusively, even when the three-dimensional information about the container calculated from the distance image of the container has an error, correction of the three-dimensional information about the container leads to a success in accurate calculation of the three-dimensional information about the container.

The invention claimed is:

1. A container measurement system, comprising:
a display device; and
processing circuitry configured to
acquire, from within a working machine that performs a loading work to a container, a distance image of the container, the working machine including an attachment having a leading end attachment, and being configured to perform the loading work of loading a load object from the leading end attachment into the container;
calculate, on the basis of the acquired distance image, three-dimensional information including a three-dimensional position and a three-dimensional shape of the container;
store, in a memory, three-dimensional shapes of various kinds of containers;
specify a kind of the container subjected to the calculation on the basis of the calculated three-dimensional shape of the container and the three-dimensional shapes of the various kinds of containers stored in the memory; and
correct, on the basis of the three-dimensional shape of the specified kind of the container, the calculated three-dimensional information about the container,
wherein the processing circuitry is further configured to
superimpose the corrected three-dimensional information about the container onto the distance image to generate a superimposed image after setting the distance image of the acquired container at the corrected three-dimensional position of the container; and cause the display device to display the superimposed image.

2. The container measurement system according to claim 1, wherein the processing circuitry is further configured to specify the kind of the container subjected to the calculation by selecting a container having a three-dimensional shape closest to the calculated three-dimensional shape of the container among the three-dimensional shapes of the various kinds of containers stored in the memory.

3. The container measurement system according to claim 1, further comprising a marker provided on the container so as to be captured in the distance image, wherein the processing circuitry is further configured to set the distance image at the corrected three-dimensional position of the container with reference to the marker.

4. The container measurement system according to claim 1, wherein the processing circuitry is further configured to acquire feature points and links of the container from two-dimensional information of the container to estimate a shape of the container, each feature point corresponding to a point on a corner of a flat part of the container, and each link representing a line connecting two feature points to each other.

5. The container measurement system according to claim 4, wherein the processing circuitry is further configured to acquire a two-dimensional image showing the container, acquire the three-dimensional information including point cloud data about the container, acquire, on the basis of the acquired two-dimensional image, the two-dimensional information including the image showing the container, positions of the feature points in the image, and positions of the links in the image to estimate the shape of the container, superimpose two-dimensional coordinates generated on the basis of the acquired three-dimensional information and the estimated shape of the container one on another, detect three-dimensional coordinates of points corresponding to the feature points from the point cloud data superimposed onto the shape of the container to calculate the three-dimensional information of the container, determine whether a three-dimensional coordinate of a first feature point is correct on the basis of an inner product of a vector from the first feature point to a second feature point and a vector from the first feature point to a third feature point among the feature points.

6. The container measurement system according to claim 5, wherein the processing circuitry is configured to acquire the two-dimensional coordinate of each piece of the acquired point cloud data through perspective projection transformation of the three-dimensional coordinate of each piece of the point cloud data, superimpose the two-dimensional coordinate of each piece of the point cloud data acquired by the coordinate conversion part and the estimated shape of the container one on another.

* * * * *